Aug. 27, 1935.　　　K. MUENZ　　　2,012,577
WHEEL BRAKE
Filed Aug. 10, 1934
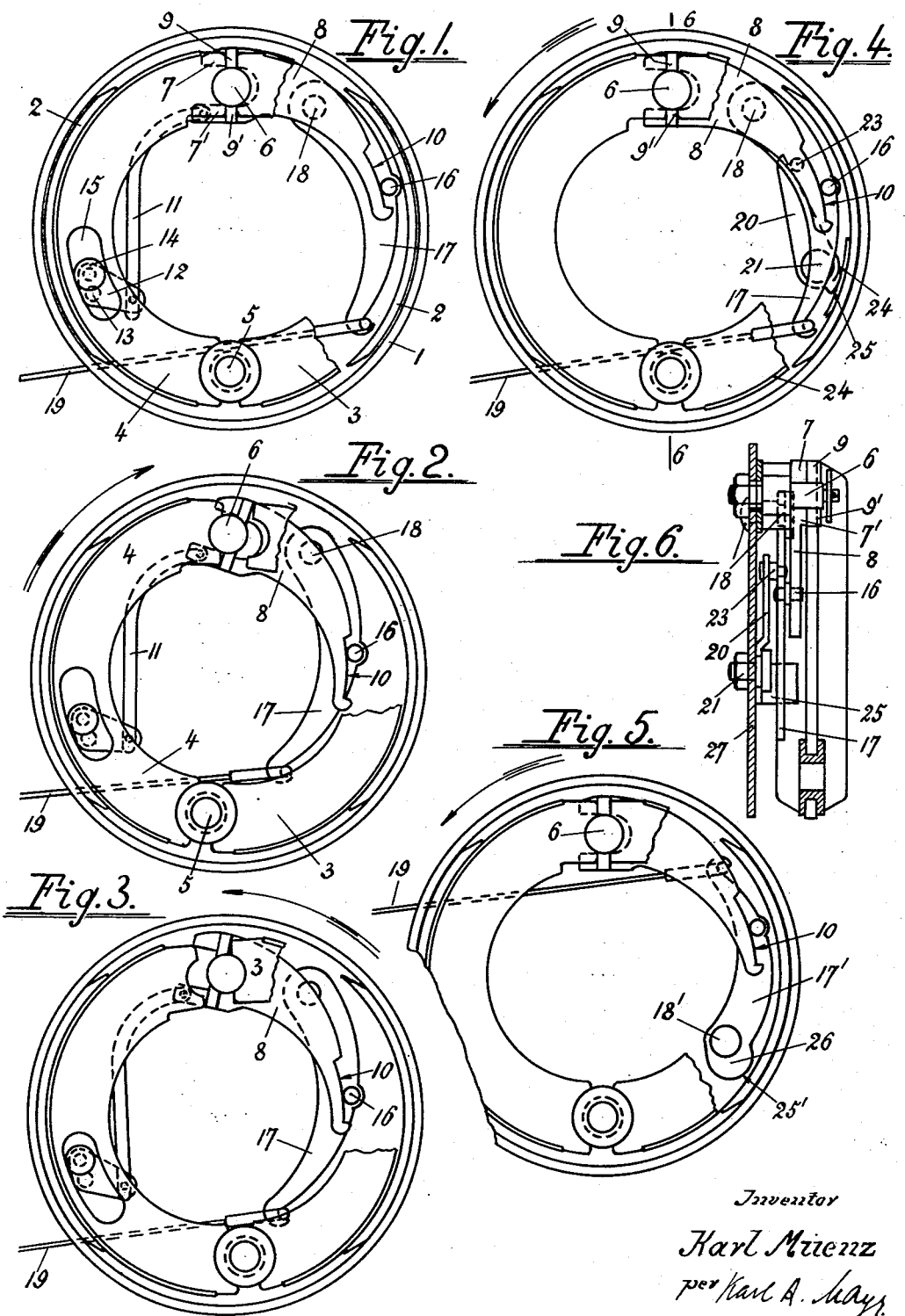
Inventor
Karl Muenz
per Karl A. Mayr
Attorney.

Patented Aug. 27, 1935

2,012,577

UNITED STATES PATENT OFFICE 2,012,577

WHEEL BRAKE

Karl Muenz, Mannheim-Friedrichsfeld, Germany, assignor to Deutsche Perrot-Bremse G. m. b. H., Mannheim-Friedrichsfeld, Germany Application August 10, 1934, Serial No. 739,341
In Germany August 5, 1933

2 Claims. (Cl. 188—78)

This invention relates to improvements in wheel brakes, more particularly to improvements in wheel brakes of the character disclosed in my copending application, Serial No. 708,391.

An object of this invention resides in the provision of a mechanism for operating wheel brakes which assures smooth operation of the same brake in both directions of rotation of the wheel and definitely prevents jerking of the mechanism when used for braking the wheels after its direction of rotation has been reversed.

A further object of this invention resides in the provision of a mechanism for operating wheel brakes which assures the same action of the brakes in both directions of rotation of the wheel independently from the status of wear of the brake blocks, brake-band and/or brake-lining.

Another object of this invention resides in the provision of a mechanism for operating wheel brakes which in addition to the advantages set out in the foregoing objects permits adjustment of the brake by one single adjusting operation.

A further object of this invention resides in the provision of a mechanism for operating wheel brakes which permits complete adjustment of the brake by only adjusting the operating member of the brake.

Another object of this invention resides in the provision of a mechanism for operating wheel brakes which assures that the stroke of the operating member of the brake is the same, no matter whether the wheels rotate in forward or in reverse direction.

Further and other objects of the present invention will be hereinafter set forth in the accompanying specification and claims and shown in the drawing which, by way of illustration, show what I now consider to be a preferred embodiment of the invention.

In the drawing:

Fig. 1 is a diagrammatic front-view of the brake according to my invention in rest position and with part of a brake block broken away.

Fig. 2 is a diagrammatic front-view of the brake according to my invention in braking position and with the wheel rotating clockwise and with part of a brake block broken away.

Fig. 3 is a diagrammatic front-view of the brake according to my invention in braking position and with the wheel rotating counterclockwise and with part of a brake block broken away.

Fig. 4 is a diagrammatic showing of a brake system according to my invention having provisions for automatic centring and with a part of a brake block broken away.

Fig. 5 is a diagrammatic showing of a modification of the brake system and centring provisions shown in Fig. 4 and with a part of a brake block broken away.

Fig. 6 is a diagrammatic cross-sectional view taken along line 6—6 in Fig. 4.

Like numerals in the drawing indicate like parts.

Referring more particularly to Fig. 1 of the drawing, 1 is the wheel, 2 the brake lining, 3 and 4 the brake blocks which are movably linked together by link means 5, 6 is a stationary pin mounted to the back plate 21 (Fig. 6) and extending in between the prongs 7 and 7' of the forked lever 8 carrying the spreaders 9 and 9' and being provided with a curve 10. A link 11 is connected with one end to the inner prong 7', and with the other end to one arm of the brake adjusting-lever 12 which rotates around the pivot 13 and carries the roller 14 which abuts against the outer inner rim of the slot 15 of the brake block 4. This brake adjusting means is more particularly described in my copending application, Ser. No. 708,391.

With the curve 10 slidingly, abuttingly co-operates the pin 16 which is fixed to the drag-lever 17 pivoted to stationary pivot 18 associated with back plate 21. 19 is a pulling member attached to the outermost end of the drag-lever 17.

Upon pulling on the member 19 the lever 17 moves clockwise and its pin 16 engages and takes forked lever 8 with it, thereby turning the spreaders 9 and 9' clockwise and forcing the ends of the brake blocks 3 and 4 apart and applying the brake.

Fig. 2 shows the brake in braking position with the wheel turning clockwise. The pin 6 thereby abuts upon the end of brake block 4 and the brake is immediately ready for operation and follows sensitively to the force applied to member 19.

If the wheel rotates in the opposite direction, i. e. counterclockwise, the whole brake mechanism including lever 8 must also move counterclockwise in order to find the resistance constituted by pin 6. If the operating member 19 is directly connected to the forked lever 8 as is done in conventional brake mechanisms, additional pull is applied to member 19 upon such movement of lever 8. The member 19 therefore exerts a greater force onto the lever 8 than is intended to be applied by the operator. As soon as the block 3 abuts upon pin 6 this excessive force causes a too sudden application of the brake and the well-known jerking when the wheels revolve in reverse direction. This is prevented by the mechanism according to my invention. With this mechanism the lever 8 can move without effecting in any way whatever the operating member 19. The curve 10 is of such configuration as to slide along pin 16 maintaining engagement therewith at all revolving motions of the brake mechanism caused by the rotation of the wheel in any direction, and by the state of wear of the brake lining etc. The drag-lever 17 is not affected at all by such motions of the brake mechanism and no pulling or loosening of the operating means 19 takes place. It may not be possible to design a curve 10 which absolutely precisely answers all possible conditions of the brake lining and other parts of the mechanism which are subject to wear, but it is comparatively easy to design an average curve which for practical purposes sufficiently correctly answers all possible conditions of practical operation. The member 19 follows exactly and only to the will of the operator and makes no motions of its own or receives additional forces from the side of the brake. The brake is equally sensitive, no matter in which direction the wheel rotates when the brake is applied and no matter to what extent the brake lining is worn away and the ends of the brake blocks are spread apart. While in the embodiment of my invention shown in Figs. 1 to 3 the arrangement disclosed in my copending application, Ser. No. 708,391, is used for automatically assuring engagement of the brake around its whole circumference, an arrangement as shown in Fig. 4 or 5 may be used instead.

In Fig. 4 a lever 20 is shown rotatable around pin 21 which is mounted to the back plate 27. Lever 8 is provided with a pin 23 abuttingly engaging one arm of lever 20. The other arm of lever 20 is equipped with sector 25 of a circle excentric with respect to pin 21 and slidingly abuttingly engaging the brake band 24. It is obvious that upon operation of the brake the sector 25 forces the brake towards the wheel always to such extent as is desirable.

Instead of providing a separate excentric as per Fig. 4, the drag-lever 17' itself may have an arm 26 carrying an excentric curve 25'. This has a similar effect as the lever 20 with the sector 25 in Fig. 4.

While I believe the above described embodiments of my invention to be preferred embodiments, I wish it to be understood that I do not desire to be limited to the exact details of design and construction shown and described, for obvious modifications will occur to a person skilled in the art.

What I claim is:—

1. A wheel brake mechanism comprising a back-plate, a brake-drum, split brake means, a lever carrying a spreader adapted to spread the brake means apart and onto the brake-drum, and being provided with a curve, a drag-lever pivoted to said back-plate and carrying means slidingly, abuttingly cooperating with said curve and thereby transmitting movements of said drag-lever onto said first mentioned lever and an operating member connected to and operating said drag-lever, and a brake adjusting means directly associated with and forming part of said drag-lever and additionally forcing said brake means onto said brake-drum proportionately to the movements of said operating member.

2. A wheel brake mechanism comprising a back-plate, a brake-drum, split brake means, a lever carrying a spreader adapted to spread the brake means apart and onto the brake-drum, and being provided with a curve, a drag-lever pivoted to said back-plate and carrying means slidingly-abuttingly cooperating with said curve and thereby transmitting movements of said drag-lever onto said first mentioned lever and an operating member connected to and operating said drag-lever, said drag-lever carrying a cam excentric to the pivot center of said drag-lever and adapted to slidingly, abuttingly engage said brake means and to force said brake means onto said brake-drum proportionately to the movements of said operating member.

KARL MUENZ.